Feb. 3, 1942.   J. W. BRYCE   2,271,539
SECONDARY CLOCK SYSTEM
Filed Dec. 1, 1939   9 Sheets-Sheet 1
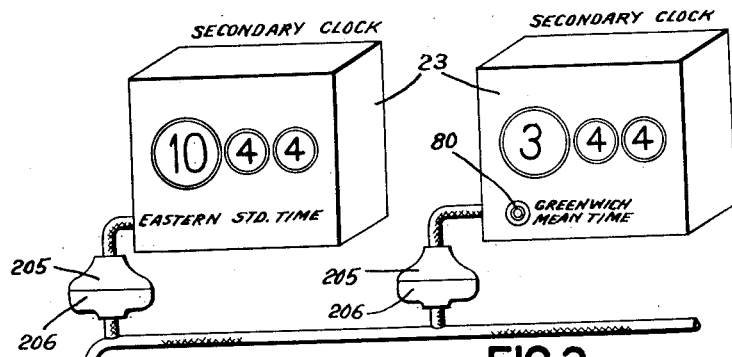
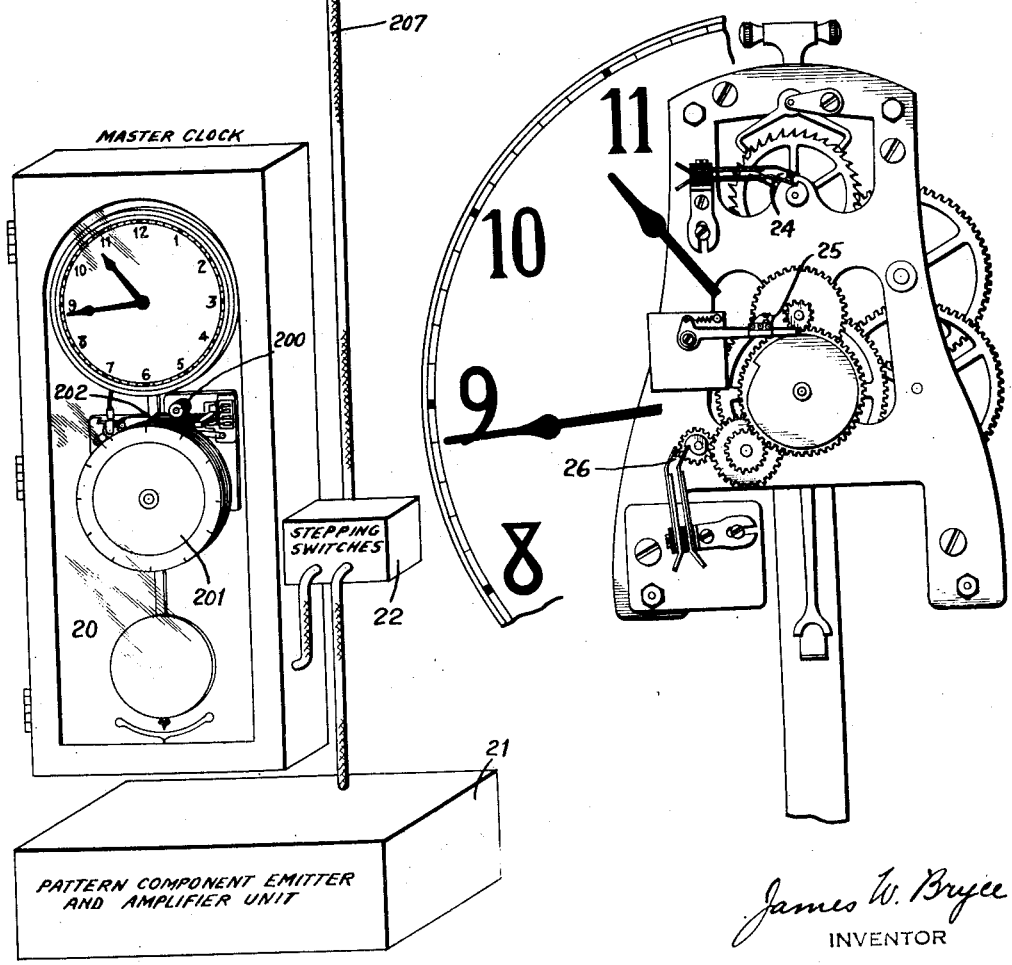
James W. Bryce
INVENTOR
BY Cooper, Kerr & Dunham
ATTORNEYS Feb. 3, 1942. J. W. BRYCE 2,271,539
SECONDARY CLOCK SYSTEM
Filed Dec. 1, 1939 9 Sheets-Sheet 2

James W. Bryce
INVENTOR

BY Cooper, Kerr & Dunham
ATTORNEYS

Feb. 3, 1942.   J. W. BRYCE   2,271,539
SECONDARY CLOCK SYSTEM
Filed Dec. 1, 1939   9 Sheets-Sheet 3

INVENTOR
James W. Bryce
BY
Cooper Kerr + Dunham
ATTORNEYS

Feb. 3, 1942.   J. W. BRYCE   2,271,539
SECONDARY CLOCK SYSTEM
Filed Dec. 1, 1939   9 Sheets-Sheet 4

James W. Bryce
INVENTOR

BY
Cooper, Kerr & Dunham
ATTORNEYS

Feb. 3, 1942.  J. W. BRYCE  2,271,539
SECONDARY CLOCK SYSTEM
Filed Dec. 1, 1939  9 Sheets-Sheet 8

James W. Bryce
INVENTOR

BY
Cooper, Kerr & Dunham
ATTORNEYS

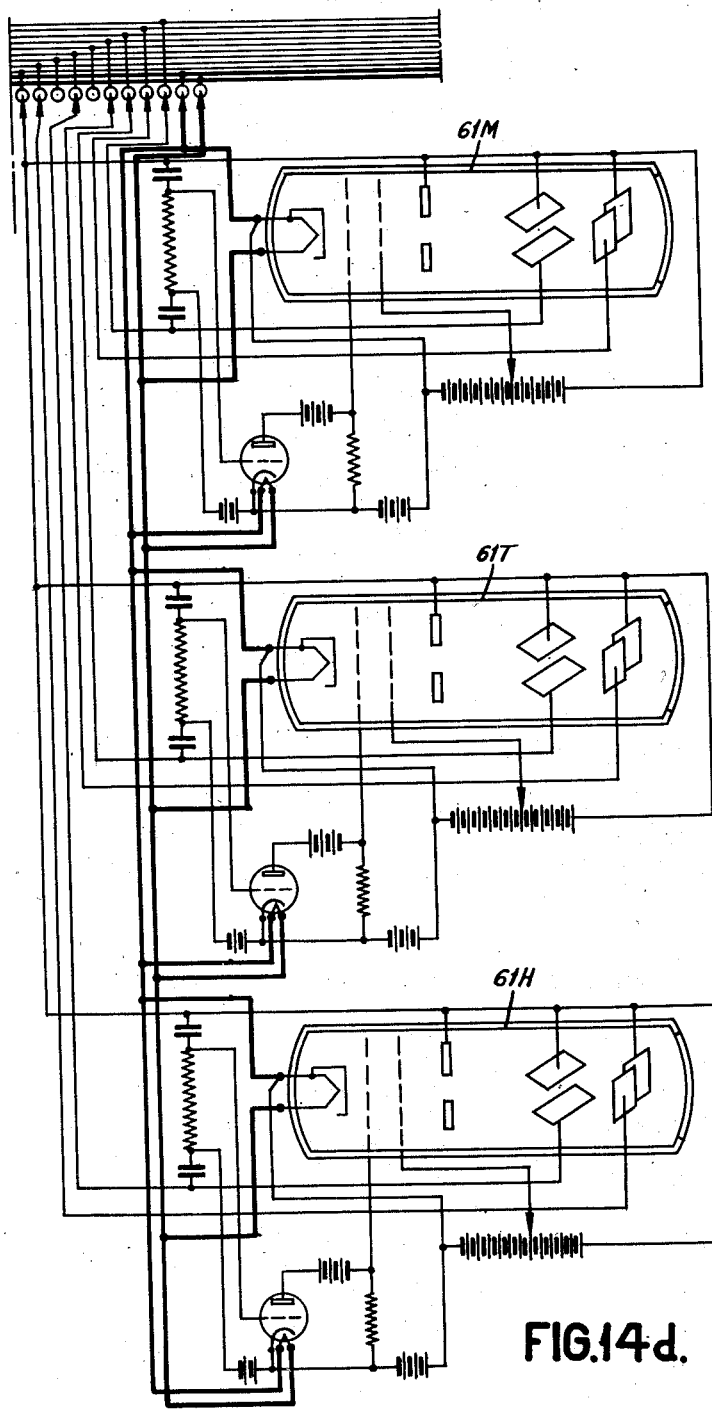

Patented Feb. 3, 1942

2,271,539

UNITED STATES PATENT OFFICE 2,271,539

SECONDARY CLOCK SYSTEM

James W. Bryce, Glen Ridge, N. J., assignor to International Business Machines Corporation, New York, N. Y., a corporation of New York Application December 1, 1939, Serial No. 307,027

9 Claims. (Cl. 58—24)

This invention has for its object the provision of an improved clock system including a master clock and one or more secondary clocks, wherein the secondary clocks are of improved form.

In general the invention has for its objects the provision of clock systems wherein the secondary clocks are always kept synchronized with the master clock without the use of any special synchronizing controls. Each secondary clock instantly changes from one time indication to the next and gives a visible indication which is visible both in the day and night time with separate illumination. The system is of such nature that the time is displayed at the secondaries by numerical characters and the characters may be of any desired size.

A further object of the present invention resides in the provision of a novel clock system which utilizes cathode tubes for the secondary clock units. Such tubes are adapted to visually display time and use very little current so that very small conductors may be employed.

A further object resides in the provision of suitable controls at a master clock for controlling the cathode ray secondary clocks so that they will all show the time of the master clock and change from one time indication to another.

A further object of the present invention resides in the provision of a clock system wherein a secondary clock may be connected to the supply lines and immediately show the time transmitted from the master clock without any manual initial setting of the secondary clock.

A further object of the present invention resides in the provision of a system wherein different times such as Eastern Standard time and Greenwich time may be optionally derived from a clock or clocks of the system without mental calculation.

A further object of the present invention resides in the provision of a clock system wherein the secondary clocks are simple, inexpensive, quick in operation, dustproof and weatherproof and so constructed that no moving parts are required therein.

An incidental object resides in the provision of novel program operated controls to cut the clocks out of circuit or in circuit at desired times. For example, the clocks may be "on" only during working hours to thereby save current and prolong the working life of the clocks and apparatus of the system.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figure 1 is an isometric view of a complete system;

Fig. 2 is a fragmentary detail view of the master clock;

Figure 13:
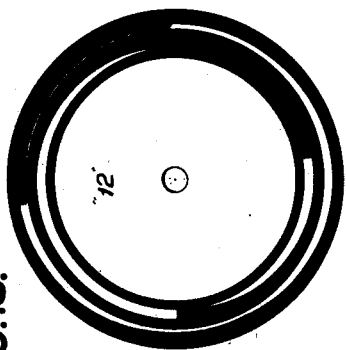
Figure 12:
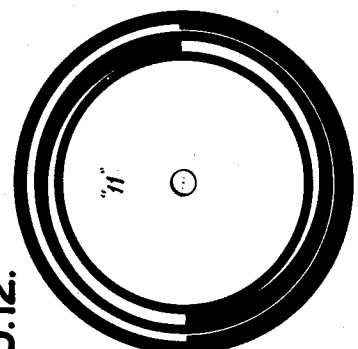
Figure 11:
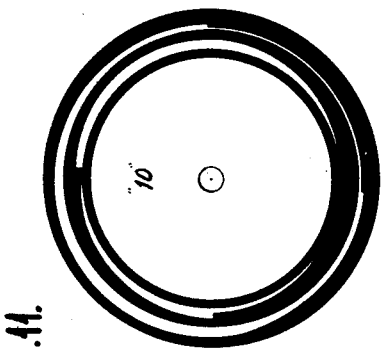
Figure 10:
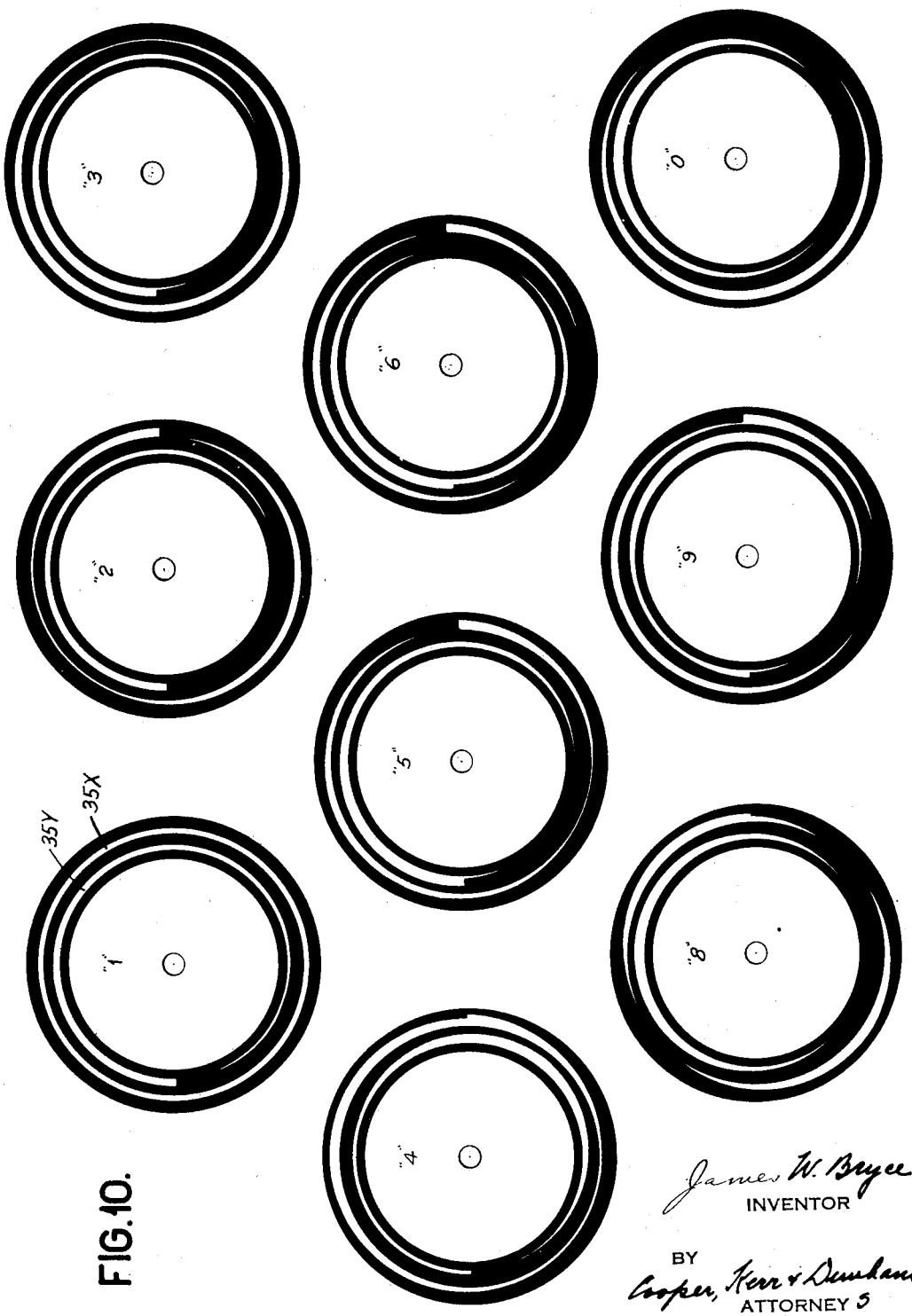

Fig. 10 shows layouts of the other pattern component emitter disks for digits 1 to 6 and 8 through 0 inclusive;

Figs. 11 to 13 are views of pattern component emitter disks for the numbers 10, 11 and 12 respectively;

Figs. 14a, 14b, 14c and 14d, taken together and arranged horizontally from left to right in the manner delineated in Fig. 15 show a complete circuit wiring diagram;

Fig. 15 is a diagrammatic view showing the relation of the circuit sheets in Figs. 14a, 14b, 14c and 14d.

Heretofore secondary clock systems controlled from master clocks have usually been of the impulse type and such systems have usually included synchronizing devices to keep the secondary clocks in synchronism with the master clock. Furthermore, impulse operated secondaries have been comparatively noisy in operation.

The present invention is directed to the provision of a novel clock system which includes secondary clocks of novel type. The secondary clocks are of such type that the use of synchronizing devices may be wholly obviated since the general nature of the system is such that the secondary clocks always display the time shown by the master clock. The secondary clocks further are an inertialess type and are absolutely silent. The master clock is of conventional form but each secondary clock unit comprises three cathode ray tubes and provision is made for controlling these cathode ray tubes from the master clock so that the tubes show hours and minutes of time throughout the day. In place of using the conventional clock dials the time is displayed by each secondary clock in numbers, i. e. railroad time, for example, a quarter of four will be shown as 3:45. The secondary clocks are luminous and accordingly the time may be seen day or night. Control of the display of numbers by the secondary clock is secured by applying proper varying voltages to the deflecting plates of the cathode ray tubes. Such controlling deflecting voltages are generated by a set of pattern component emitter devices which are disposed at the master clock. There are a plurality of such pattern component emitters one for each of the digits from 1 through 0 and one for each of the numbers 10, 11 and 12. The master clock controls stepping switches, which connect the proper pattern component emitters to the secondary clocks so that they will display figures representative of hours and minutes.

The system is also adopted for displaying time according to European Continental practice, that is to say, two o'clock p. m. could be shown as 14.

General layout of system

Referring to Fig. 1, 20 generally designates the master clock unit which has the customary program unit. 21 is the pattern component emitter and amplifier unit. The stepping switch unit which is controlled from the master clock unit is generally designated 22. 23 represents secondary clocks. In the drawings only two of such secondary clock units are shown, but it is obviously noted that the system can include any number of secondary clocks. The secondary clocks may be connected by plugs to suitable cables which extend to the stepping switch unit and the stepping switch unit is cabled to the pattern component emitter unit and also is connected by cables to the master clock unit.

Master clock

Referring to Fig. 2, the master clock may be of any suitable type. The master clock herein shown is of the type shown in United States patent to Bryce, No. 1,687,481. The master clock in addition to having the usual minute contacts 24 and hour contacts 25 is provided with a set of contacts 26 which close every ten minutes. These contacts are cam operated in the customary way and the cam is geared back to the hour shaft to make one revolution every ten minutes.

The master clock may also include a program unit which may be of the type shown in United States patents to Geiger, No. 1,791,927, and Larrabee, No. 1,680,742.

The program device includes the usual calendar wheels 200 and hourly program disks 201. The calendar wheels in conjunction with the program disks are adapted to close program contacts generally designated 202 on Fig. 1. On the circuit diagram (Fig. 14b) such contacts are individually designated 202a and 202b. These contacts may be used to turn on and off current supply for the system at selected times through the use of the usual make and break relay 204 (Fig. 14b). Each actuation of this relay under control of contacts 202a or 202b will shift contacts 212. Closure of 202a causes closure of 212 and closure of 202b causes opening of 212.

General characteristics of cathode ray tubes

Before describing the details of the system, the general characteristics of the cathode ray tubes which are used in the secondary clocks may be briefly described. A typical and suitable cathode ray tube is illustrated diagrammatically on the circuit diagram (Fig. 14c). Such a tube comprises an evacuated body into which extends a heater element 27. Associated with the heater element is a cathode 28 providing a source of electrons. Also within the evacuated body and disposed in order from left to right is a grid 29, an anode number "1" designated 30, an anode number "2" designated 31 and two pairs of deflector plates. The upper and lower vertical deflector plates are respectively designated YU and YL and the horizontal deflector plates are designated XL and XR. XL signifies horizontal deflection to the left and XR horizontal deflection of the right. The right hand end of the cathode ray tube includes the usual fluorescent screened end 32. The "Y" deflector plates are plates above and below the center axis of the tube. The "X" deflector plates are disposed to the right and left of the center axis of the tube.

In the operation of the cathode ray tube, if no potential is applied to either set of plates the stream of electrons will be emitted along the central axis of the tube and impinge on the fluorescent screen 32 at the center of the screen. This will illuminate a spot at the center of the tube. If, however, the potential on the horizontal and vertical deflecting plates is changed, the stream of electrons can be deflected either upwardly or downwardly or to the right or the left or in combined resultant directions. Changing relative potential on the Y set of plates will bring the stream of electrons up or down and similarly changing the relative potential on the X plates will divert the stream of electrons alternatively to the right or left. By providing proper potential and proper changing potential over a period of time on both sets of plates any desired figure or character can be traced on the fluorescent screen 32. By repeatedly tracing the beam of electrons to the proper points or areas of the screen, an image may be produced which can be visibly read in the day time or at night. Cathode ray tubes are adapted to operate and deflect electron beams at an exceedingly high frequency. They may accordingly be termed "inertia free image tracing devices."

Having generally described the characteristics of a cathode ray tube, there will now be described one manner of providing the deflector voltages which control the movements of the tracing of the electronic beam of the various tubes.

Pattern component emitter unit

The pattern component emitter assembly 21 (see Figs. 1 and 5) includes a driving motor 33 which by any suitable drive such as by the belt and pulley arrangement shown is adapted to constantly rotate a pair of shafts 34.

Figure 7:
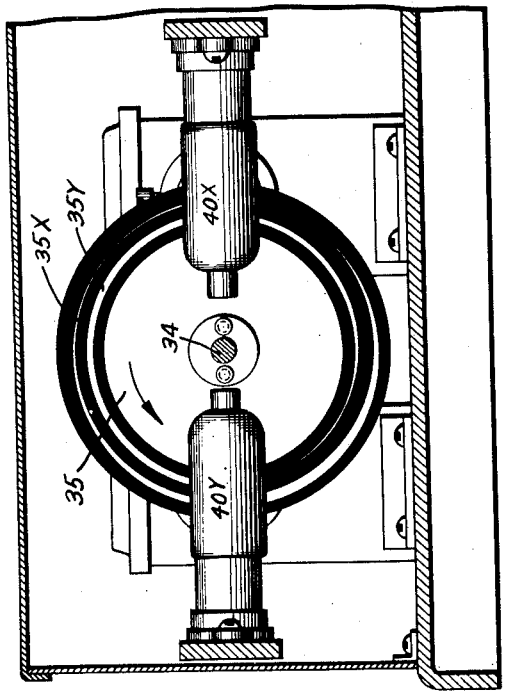
Fig. 7 is an elevational detail view taken on line 7—7 of Fig. 6.
Figure 5:
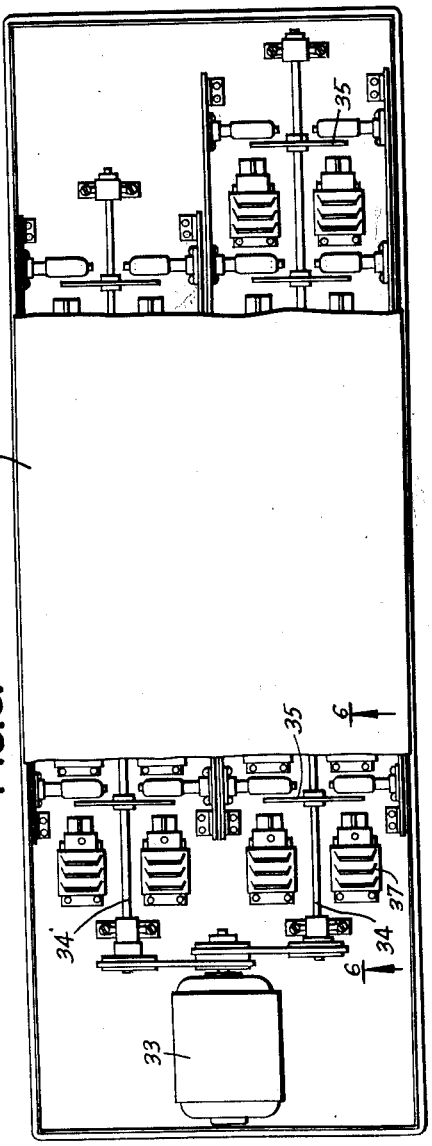
Fig. 5 is a top plan view of the pattern component emitter unit, with portions of a cover broken away to show the parts beneath.
Figure 6:
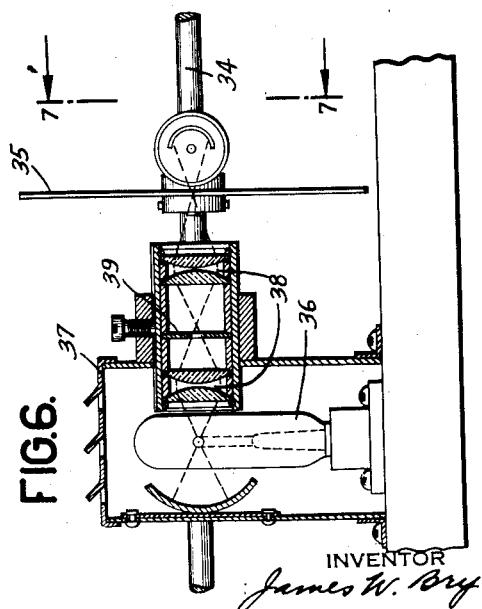
Fig. 6 is a detail sectional view taken on line 6—6 of Fig. 5 and looking in the direction of the arrows.

Fixed at intervals along these shafts 34 are a series of pattern disks, one of which is designated 35 in Figs. 5, 6 and 7. For a clock system of the type herein shown, thirteen disks 35 are required. Each disk 35 is generally opaque but is provided with two transparent tracks (see Fig. 7). One track is designated 35X and the other track is designated 35Y. For each disk 35 there is provided two sources of light. Each source of light preferably comprises a lamp 36 within a lamp box 37 together with a suitable set of lenses 38. An apertured diaphragm 39 is provided to direct and concentrate the light received from the light source on to and through the transparent tracks of the disk 35. One light source directs light to and through the 35X track and the other light source directs light through the 35Y track. On the opposite side of each disk from the light source there are provided two photo-cells which are respectively designated 40X and 40Y.

If the width of one of the tracks 35X is varied at different angular positions around disk 35, different amounts of light will be allowed to pass to the photo-cell 40X upon rotation of the disk. This variable illumination will vary the output of the circuit controlled by the particular photo-cell. The photo-cells act to allow more or less current to flow in their related circuits depending upon the amount of light which they receive.

Figure 8:
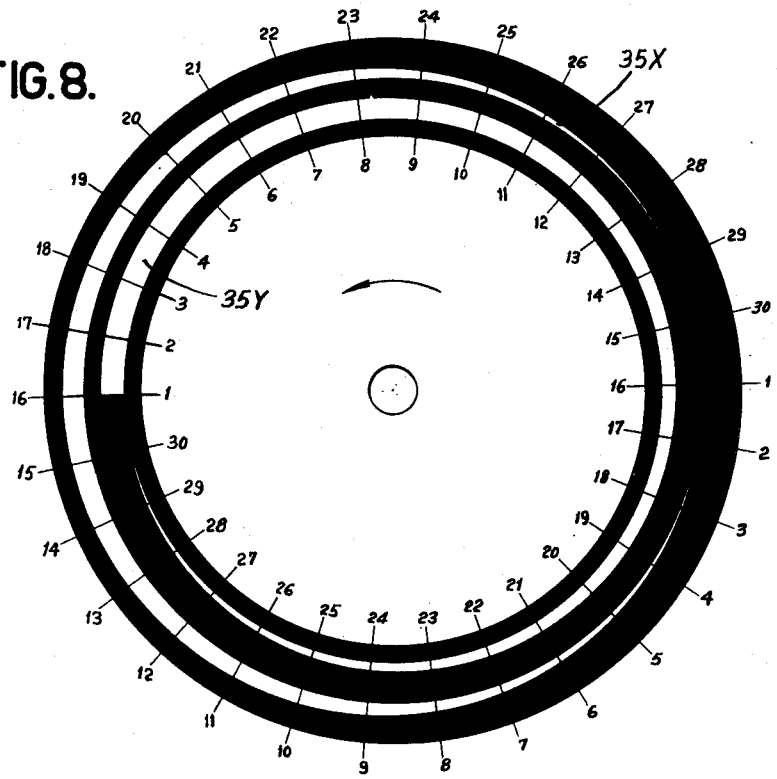
Fig. 8 is a detail view of a pattern component emitter disk. The particular disk illustrated is the one for affording the components to represent the digit 7.
Figure 9:
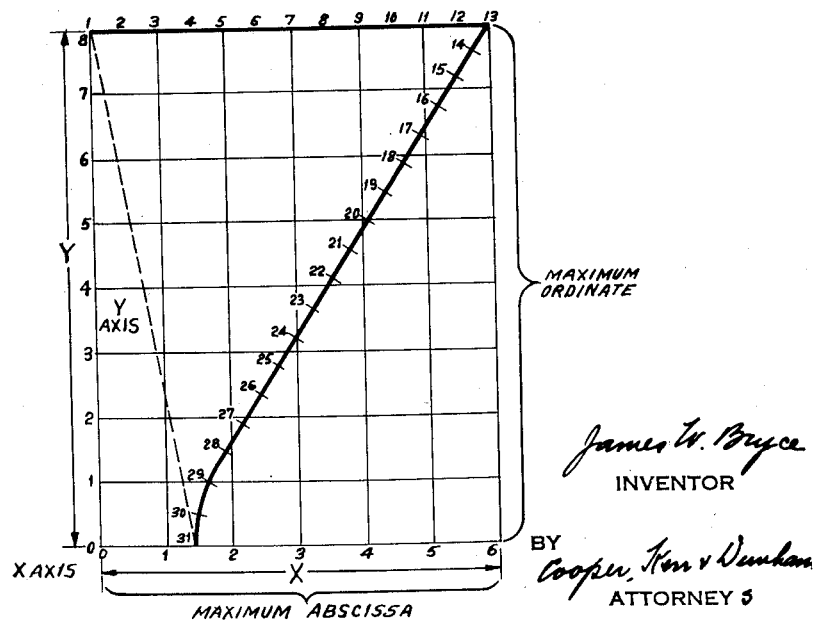
Fig. 9 is a diagrammatic graph view showing the digit 7 with various plotting points delineated thereon.

The manner of laying out the disks will now be explained. Referring to Figs. 8 and 9, on Fig. 9 the outlines of the numeral 7 have been laid out. As here shown, the numeral 7 has been divided into a set of sections of equal length, this particular character being divided into sections 1 to 31 inclusive.

In order to trace the electron beam for the upper horizontal part of the figure 7, the Y component voltage should be maintained constant while points 1 to 13 are traced. If the disk of Fig. 8 be examined and the 35Y track be traced from 1 to 13, it will be noted that the transparent track has a constant maximum width from all points from 1 to 13, thereafter the tracing beam should be caused to both descend and move to the left. To cause descent of the beam there is a gradual diminution of the width of the Y track from point 13 back to point 31. Referring now to the 35X track, the X component at point 1 is 0. From this point 1 to point 13, the X track gradually increases in width as indicated on the disk. From point 13 back to point 30 the X track progressively diminishes in width.

To determine the width of the Y track at any point as for example point 19, the Y ordinate distance between the X axis and point 19 in a drawing of the character such as Fig. 9 is determined, this distance is then multiplied by a constant, the value of which is determined in a manner to be described. The resulting amount will give the width of the Y track at point 19 on the disk.

The constant referred to above is the ratio of a predetermined arbitrary maximum width of the Y track on a disk with respect to the maximum ordinate value for the character in Fig. 9. This arbitrary value depends upon the circuit relations and characteristics of the photo-cell and amplifier tubes which are used for this track.

The width of the X track at point 19 is the X abscissa distance between the Y axis and point 19 multiplied by another constant. This constant is the ratio of the predetermined arbitrary maximum width of the X track with respect to the maximum abscissa value for the character in Fig. 9. This arbitrary value again depends upon the circuit relations and characteristics of the X amplifier circuit. In this case the constants used were identical, but such requirement is not essential.

Fig. 10 shows the configuration of the tracks which are used for digits from 1 through 6 inclusive and 8 through 0 inclusive. Figs. 11, 12 and 13 show the track configurations for controlling the display of numbers 10, 11 and 12 respectively.

It may be explained for these particular disks that if a number containing two characters is to be traced, one digit is traced before the other digit is traced. The disks, however, rotate at such a rate that both digits are concurrently displayed.

The various disks of Figs. 8, 10, 11 to 13 inclusive constitute what may be termed "pattern component emitters" and if these disks are maintained in a state of rotation at relatively high speed it will be appreciated that they will progressively vary the X coordinate component voltages and the Y coordinate component voltages which are applied to the deflecting plates of the cathode ray tubes.

It may be further explained that a common set of pattern component emitters are utilized for controlling the cathode ray tubes of all the secondary clocks irrespective of the number of clocks employed in the system and the number of tubes in each clock.

*Stepping switch mechanism*

Figure 4:
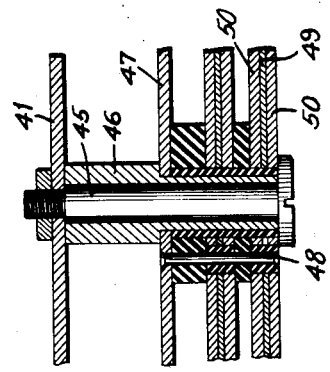
Fig. 4 is a sectional view taken on line 4—4 of Fig. 3.
Figure 3:
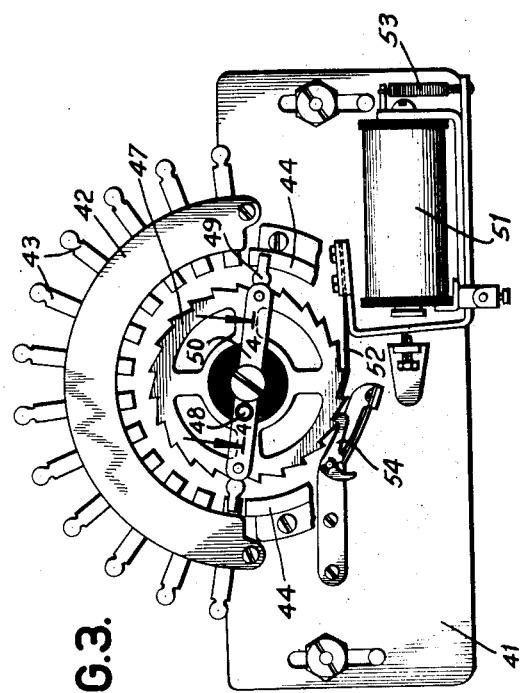
Fig. 3 is an elevational view of a stepping switch.

In order to variably connect the cathode ray tubes of the secondary clocks to the pattern component emitter unit as the time changes, suitable switching mechanism is provided controlled by and from the master clock. While various forms of switching devices may be used, Figs. 3 and 4 show a suitable switching mechanism. 41 is a suitable mounting plate which has mounted on it an insulating segment 42. Segment 42 is provided with metallic conducting pieces 43 which are distributed around the periphery. A common conducting segment 44 is also mounted on plate 41 and insulated from it. Plate 41 has secured to it a stud 45 (see Fig. 4). Rotatable on the stud 45 is a sleeve 46 which has fast to it a ratchet 47. Secured to the ratchet by a suitable rivet 48 are two wiper arms 49. These wiper arms are disposed between insulating pieces 50 and the wiper arms are also insulated from the sleeve 46 in the manner shown in Fig. 4. As the ratchet 47 is rotated from one position to the next, the wiper arms 49 will provide a circuit from the common segment 44 successively to each of the individual segments 43. In order to rotate the ratchets step by step there is provided a magnet 51 which, upon energization, is adapted to move an armature 52 to the right as shown in Fig. 3. Upon de-energization of the magnet, the armature returns to the left under the action of the spring 53, thereby rotating the ratchet 47 one step in a clockwise direction. Retrograde motion of ratchet 47 is prevented by a dog 54. In the complete system several of these stepping switch devices are provided. One stepping switch is provided with twelve segments, another with ten segments and another with six segments.

The various segments 43 are connected to various sections of the pattern component emitter and amplifier unit as will be hereinafter described in detail. It may be mentioned that one segment may connect in circuit the pattern component emitter for the digit 1, another segment the unit for the digit 2 and so on. Magnet 51 is rotated under control of the master clock.

*Photo-cell and amplifier circuits*

As explained before, two photo-cells are provided for each digit or number whose image is to be traced. Such photo-cells are in turn controlled by the disks heretofore described.

Amplifier circuits preferably including electron discharge devices are controlled by the photo-cells 40X, 40Y, etc. These amplifier circuits are adapted to produce variations in potential across the deflecting plates of the cathode ray tubes in accordance with variations of light impressed on the photo-cells.

Referring, for example, to the photo-cell 40X, which is utilized to control the horizontal deflection of the cathode ray beam in a cathode ray tube such as 61, for setting up the digit 1. The photo-cell is connected in series with a battery 62 and a resistor 63, whereby the difference of potential across the resistor varies in accordance with the illumination of the photo-cell. The grid cathode circuit of a vacuum tube 64 conveniently biased negative at all times by the battery 65, includes a portion of the resistor 63, preliminary adjustable by a contact 66 on the resistor. The plate cathode circuit of the tube 64 includes a B battery or other source of direct current 67 and a resistor 68 in series therewith intermediate the positive side of the battery 67 and the plate of the tube 64. For impressing a proper voltage across the horizontal deflecting plates XL and XR of the cathode ray tubes 61, which are connected to the terminals 69 and 70 of the amplifier unit, a biasing network is conveniently provided, including a resistor 71 connected across a source of voltage preferably comprising the series connected batteries 72, 73. The conductor intermediate the batteries 72, 73 is also connected to a preliminarily adjustable contact 74 on the resistor 68 and the terminals 69, 70 are respectively connected to a preliminarily adjustable contact 75 on the resistor 71 and to the positive side of the battery 67 (i. e. the positive end of the resistor 68).

It will now be seen that if the photo-cell 40X receives no illumination or a predetermined minimum illumination, the grid of the tube 64 will have a predetermined maximum negative bias. The contact arms 66, 74 and 75 are conveniently so adjusted (in a manner which will be readily understood by those familiar with the art) that for this 0 or predetermined minimum illumination of the cell 40X the resulting maximum negative bias on the grid of the tube 64 will be such that the output voltage between the terminals 69 and 70 will maintain the electron beam at one side of its horizontal path of travel, viz., the left-hand side in the apparatus illustrated. That is, although the contact arm 74 is negative with respect to the positive side of the battery 67, the biasing network including the resistor 71 imposes sufficient opposing voltage in the circuit of the deflector plates XL, XR, as to make the terminal 69 just sufficiently positive with respect to the terminal 70 to maintain the electron beam in its extreme left-hand position. Now, as the illumination of cell 40X increases, the negative bias on the grid of the tube 64 decreases, resulting in an increase of plate current and a corresponding increase of the potential drop between the positive side of the battery 67 and the contact 74. As a result, the potential of terminal 69 becomes less positive with respect to the terminal 70; the adjustments of the contacts on the resistors being conveniently such that the potential between the terminal 69 and 70 becomes zero for an illumination of the photo-cell 40X which is intended to represent a positioning of the cathode beam at the middle of its horizontal path. Increase of the illumination beyond this point results in making the terminal 70 positive with respect to the terminal 69, until at the point of maximum illumination, the cathode beam is deflected to its extreme right-hand position.

It will be understood that the amplifier and balancing circuits controlled by the photo-cell 40Y are conveniently identical with those herein above described for the cell 40X so that the vertical displacement of the cathode beam between plates YL and YU is obtained by a correspondingly similar variation of output potential between the terminals 76, 77, to which these plates are connected.

Since it will now be understood that the actual position of the cathode ray beam at any instant depends upon the controlling potentials or varying coordinate electrical components applied to both sets of deflecting plates XL, XR and YL, YU, the position of the beam is directly controlled (through the instrumentality of the amplifier circuits described) by the amount of illumination respectively received by the photo-cells 40X, 40Y. Thus, as the illumination respectively received by these photo-cells varies during rotation of the pattern component emitter, the cathode ray beam traces a path to portray the particular digit character (in this case the character 1) represented by the particular pattern component emitter which controls the illumination of the photo-cells, that is, the tracks 35X and 35Y respectively provide a predetermined variation in the illumination of the photo-cells 40X and 40Y for each cycle of rotation of the emitter and the resultant of the corresponding variations in deflecting potentials or varying coordinate electrical components on the plates of the cathode ray tubes, causes the cathode ray beam to trace a path—in this case a path depicting the character 1, which is predetermined by the pattern component emitter.

As shown in Fig. 1, it will be noted that the left hand cathode ray tube of each secondary clock is larger than the other tubes to the right. This larger left hand tube is provided to distinguish the hour indications from the minute indications. It is accordingly, necessary to provide auxiliary output circuits in the amplifier units to trace characters of larger size. This will now be described.

Figure 14A:
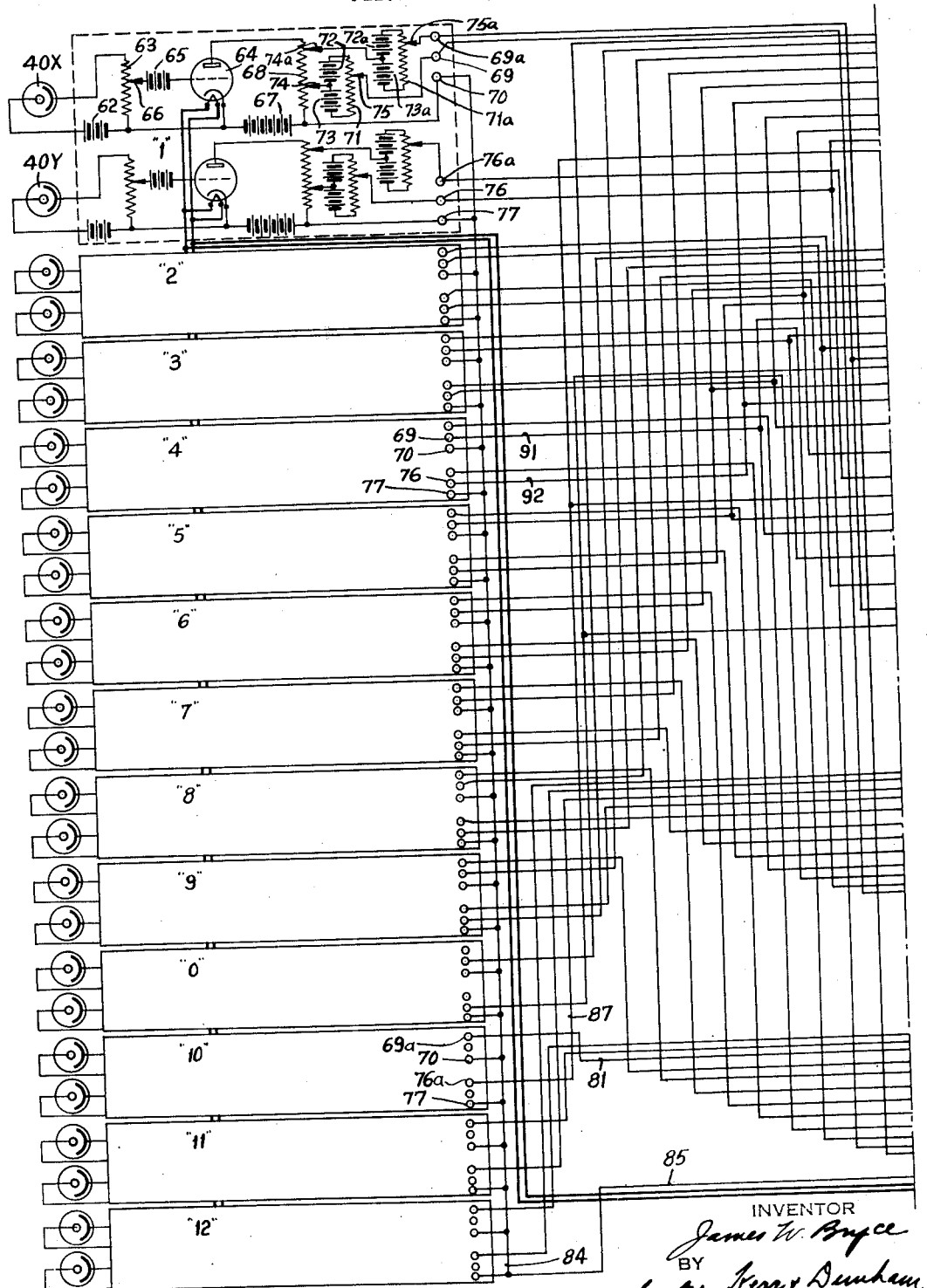
Figure 14:
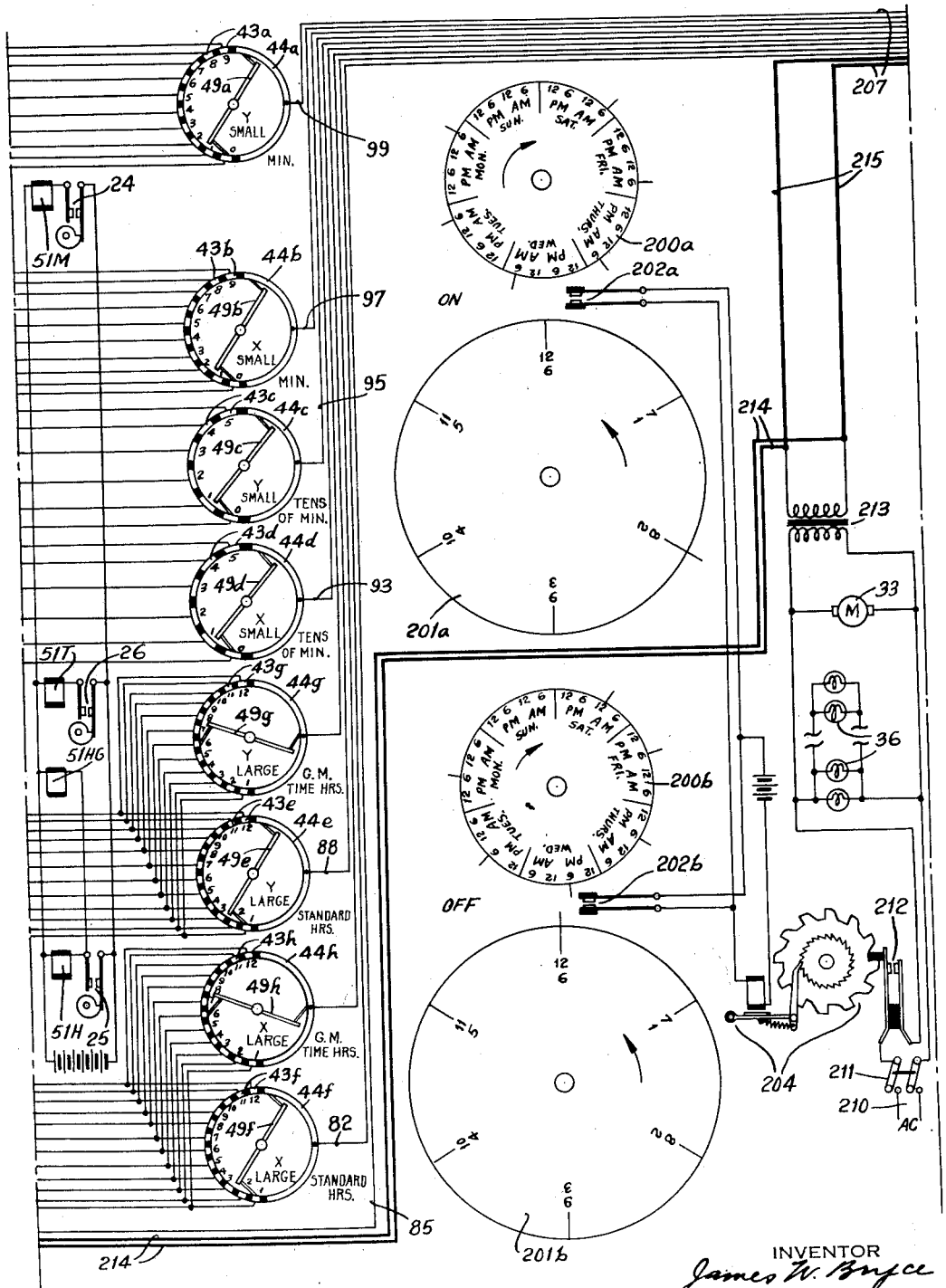
Figure 14C:
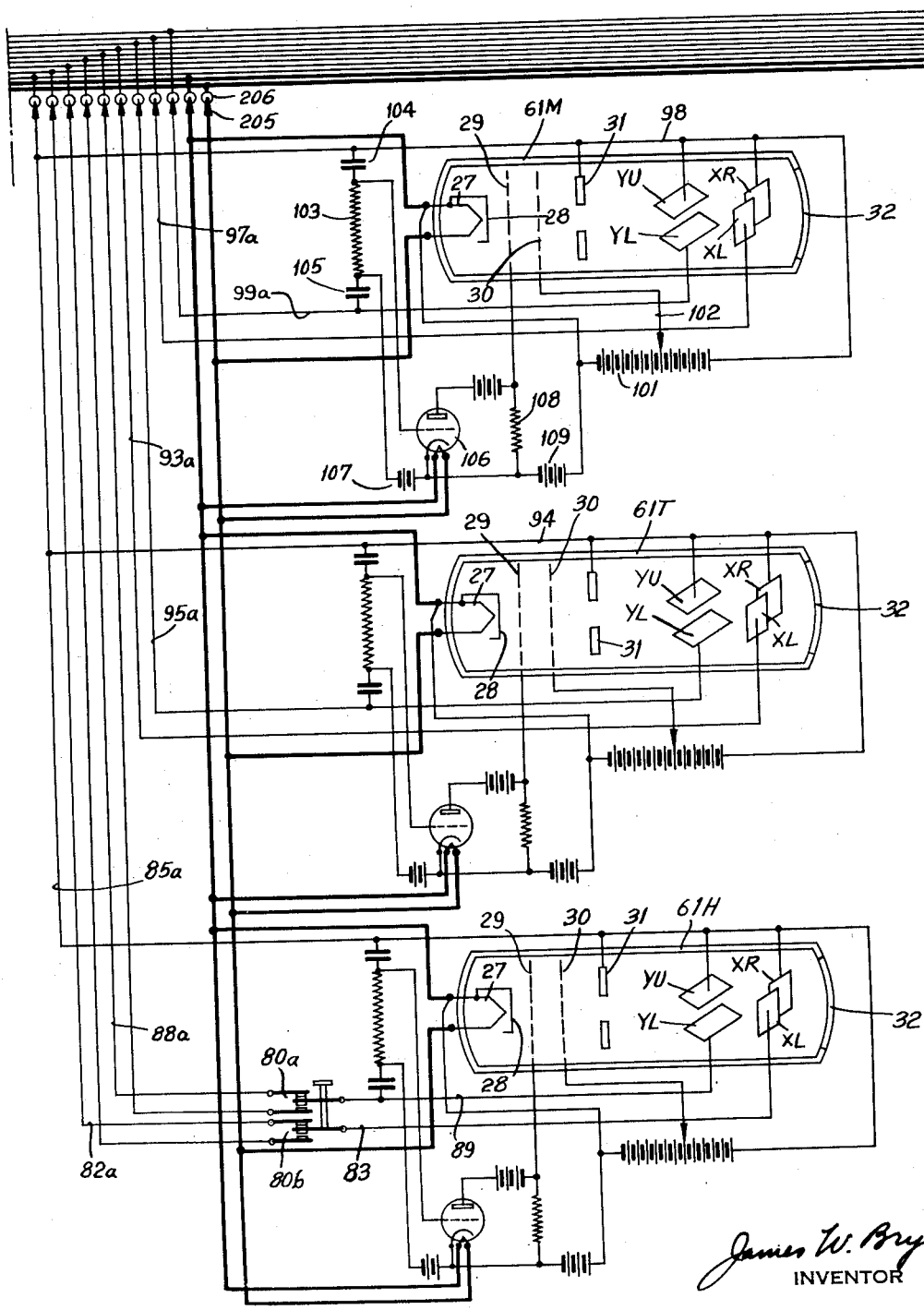

Referring to Fig. 14a it will be noted that there is a supplemental arm 74a picking off the voltage variation across the load resistor 68. 74a is connected into a network 72a, 73a, 71a, etc. The arm 75a connects the network to an extra output post or terminal 69a. It will be appreciated that the arm 74a picks off a greater potential than the arm 74 and this greater potential will provide a greater deflecting voltage for the cathode ray tube which is used for displaying large figures. The biasing network otherwise functions in the manner previously described.

The foregoing description has explained in detail one section of the amplifier unit with its connections to the photo-cells and to the output terminals of the amplifier for the figure 1. It will be understood that the amplifier is arranged with a plurality of sections of identical construction and wiring. There are such additional sections for characters 0, 2 through 9 inclusive, 10, 11 and 12. Such sections are indicated by correspondingly numbered boxes on Fig. 14a of the wiring diagram.

As shown on Fig. 14b, the lamps 36 and the motor 33 may receive current from a source 210 through a switch 211 and such current supply may be under the control of the program controlled contacts 212.

It will be appreciated that suitable current supply and proper circuits for the heater elements of the amplifier tubes 64 and for the heaters of the cathode ray tubes 61 should be provided. Current supply for such heater elements may be provided by a transformer 213. The primary of this transformer is controlled by the program contacts 212. The secondary of the transformer is connected to lines 214 which lead to the heater elements of the amplifier tubes 64 (see Fig. 14a). Other lines 215 lead through suitable cables to the heater elements of the cathode ray tubes 61 of the various secondary clocks and to the heater elements of the amplifier tubes 106 in the various secondary clocks. Such amplifier tubes 106 will be hereinafter described in greater detail.

When the clock system is in use and at proper times, suitable current supply is provided by the program devices, for the cathode ray tubes 61 and for the amplifier tubes 64. The cathode ray tubes 61 are at the various secondary clocks and the amplifier tubes 64 are at the master clock.

Circuit diagram

Before describing the details of operation of the circuit diagram of the system it may be first generally explained that there are two stepping switches provided for minute control. These are so labeled on Fig. 14b. The next two switches below are the switches for controlling tens of minutes and are so labeled and the bottom four stepping switches are for hour control. In connection with the hour control it may be mentioned that with the present system provision is made for obtaining a supplemental time reading for Greenwich Mean time at a secondary clock, that is to say, if the secondary clocks show Eastern Standard time for example, by pushing a button on a particular secondary clock, Greenwich Mean time or some other time may be shown at that clock.

Switches designated 43a—44a and 43b—44b control the Y and X deflecting voltages respectively of the cathode ray tubes 61M ("M" signifying minutes) (see Fig. 14c). The switches 43c—44c and 43d—44d control the Y and X deflecting voltages respectively of the cathode ray tubes 61T ("T" designating tens of minutes) (see Figs. 14c and 14d). The switches 43e—44e and 43f—44f control the Y and X deflecting voltages respectively of the cathode ray tubes 61H ("H" designating hours).

The individual segments 43a of switch 43a—44a are connected to the output posts 76 of the amplifier unit for the 40Y photo-cells which analyze the Y track of the 0, 1, 2-9 pattern component emitter disks. The individual segments 43b of switch 43b—44b are connected to the output terminals 69 of the amplifiers for the 40X photo-cells which analyze the X track of the 0, 1, 2-9 pattern component emitter disks. The individual segments 43c of switch 43c—44c are connected to the related output terminals 76 of the amplifier units for the 40Y photo-cells which analyze the Y track of the 0, 1, 2-5 pattern component emitter disks. The segments 43d of switch 43d—44d are connected to the related output terminals 69 of the amplifier units for the 40X photo-cells which analyze the X track of the 0, 1, 2-5 pattern component emitter disks.

The individual segments 43e of the switches 43e—44e are connected to the related output terminals 76a of the amplifier units for the 40Y photo-cells which analyze the Y track of the 1, 2-9, 10, 11 and 12 pattern component emitter disks. The individual segments 43f of switches 43f—44f are respectively connected to the output terminals 69a of the amplifier units for the 40X photo-cells which analyze the X track of the 1, 2-9, 10, 11 and 12 pattern component emitter disks.

As explained before, provision is made to enable a clock or clocks to display Greenwich Mean time as well as Eastern Standard time for example. To provide for such alternative reading of a particular clock, supplemental switches are provided. For this purpose the following switches and wiring are provided. Wired in parallel with the segments 43e and 43f are the segments 43g and 43h respectively of switches 43g—44g and 43h—44h. The switch arms 49g and 49h are disposed five steps in advance of the arms 49e and 49f to thereby afford a control for the cathode ray tubes 61H to indicate thereon the hours for Greenwich mean time which is five hours ahead of Eastern Standard time.

To explain further, if Eastern Standard time is to be read at a secondary clock, the control is derived from the switch arms 49e and 49f. If Greenwich mean time is to be read at a secondary clock, the control is derived from the switch arms 49g and 49h.

The foregoing description has traced the circuit relations between the amplifier terminals and the stepping switches, and more particularly to the segments to the stepping switches. The circuits from the common strips of the stepping switches to the secondary clocks will now be explained.

Referring to Fig. 14b, common segment 44a is connected to a circuit leading to the YL plates of the cathode ray tubes 61M of all the secondary clocks. Likewise common segment 44b is connected to the XL plates of the tubes 61M in all the secondary clocks.

In practice it will be understood that a common set of wires in a cable will extend to the various secondary clocks and all of the clocks will be connected in multiples to the wires in such cable. In practice each secondary clock may have its various circuit connections extended to a plug such as 205 (see Fig. 1) which can be inserted in a receptacle 206 which is suitably connected to the wires within the cable generally designated 207 in Fig. 1. The cable 207 also includes the wires 215 previously referred to which supply current to heaters of the amplifier and cathode ray tubes of the secondary clocks.

Referring now to Fig. 14b of the circuit diagram, 24 are the master clock control contacts which close once a minute. These contacts upon closure, energize a motor magnet 51M. 51M upon successive energization advances the arms of the minute stepping switches. Contacts 26 are the master clock control contacts which close every ten minutes to energize motor magnet 51T. These magnets in turn effect the advance of the stepping switch arms 49c and 49d which pertain to tens of minutes control. Contacts 25 are the master clock control contacts which close once an hour to energize stepping switch magnets 51H and 51HG. 51H advances the stepping switch arms 49e and 49f pertaining to hours and stepping switch magnet 51HG advances the advanced stepping switch arms 49g and 49h which control Greenwich Mean time indications.

Greenwich Mean time control

Referring to Fig. 1, it will be noted that one of the secondary clocks, i. e. the one to the right, is shown with a supplemental button 80. While this supplemental button is shown on one clock only, it is obvious that it can be provided on all of the clocks if it is so desired. Depression of 80 on any clock provided with this feature shifts contacts 80a and 80b (Fig. 14c) so that the circuits to the Y and X deflecting plates of the hours cathode ray tube 61H are derived from the common segments 44g and 44h instead of from the regular segments 44e and 44f. This gives an advanced indication of the hour time reading at the particular secondary clock where the supplemental button is depressed.

Circuit and operation

The complete circuit will now be traced for displaying a time indication at a particular clock. Assume the master clock shows ten hours and forty-four minutes. With this condition of the master clock, the switch arms 49e and 49f will be resting on the "10" number segments 43e and 43f respectively. Circuits will be completed traced as follows: From output terminal 69a of the "10" amplifier unit, line 81, segment spot number 10 of the 43f group, arm 49f, common segments 44f, wire 82 in cable 207, through the plug and via wire 82a (Fig. 14c) to contacts 80b in the position shown and through wiring 83 to the XL plate 61H. Also at this time the 70 terminal of the "10" amplifier unit is connected to a common line 84 (Fig. 14a) which extends via wire 85 in the cable 207, through the plug and through wire 85a in the secondary clock, to the XR plate of tube 61H. Accordingly, the changing potential variations between terminals 69a and 70 will effect proper horizontal deflection of the beam of the cathode ray tube to properly trace the horizontal component voltages for tracing the two digit number "10." For controlling the vertical deflecting potentials on the Y plates, the following circuits are established. From terminal post 76a of the "10" amplifier unit, a circuit is established from wire 87 (Fig. 14a) to the "10" segment spot of the 43e group (Fig. 14b) thence through arm 49e, common segment 44e, wire 88 in the cable 207, through the plug and wire 88a (Fig. 14c) in the secondary clock, through contacts 80a in the position shown, wire 89 to the YL plate of tube 61H. The YU plate is connected to wire 85a which by the circuit previously traced is extended to terminal post 77 of the "10" amplifier unit. Accordingly, the potential variations between posts 76a and 77 are applied respectively to the YU and YL plates of tubes 61H. With such X and Y change of potentials applied to the plates of this tube 61H from the "10" amplifier unit, the number 10 will be traced on the screen of the cathode ray tube 61H.

In order to display forty-four minutes on the tens and units tubes, the following circuits are established. From the 69 terminal of amplifier unit "4," a wire 91 (Fig. 14a) leads to the 4th segment spot of segments 43b (Fig. 14b) and the 4th segment spot of segment group 43d. From terminal 76 of the "4" amplifier unit a wire 92 leads to the 4th segment spot of segment 43a and to the 4th segment spot of segment 43c. At this time switch arm 49d is standing on the "4" segment spot. Accordingly, a circuit is completed from this switch arm to strip 44d, thence via wire 93 in the cable 207, through the plug, wire 93a in the secondary clock to the XL plate of tube 61T. The XR plate of this tube is connected to a wire 94 which extends back via lines 85a and 85 to the 70 terminal of the "4" amplifier unit. At the same time switch arm 49c is standing on the 4 segment spot of the 43c group and a circuit is completed through 44c, via a wire 95 in cable 207, through the plug wire 95a in the secondary clock, to the YL plate of tube 61T. The YU plate is connected to the line 94 which through the circuit previously traced connects back to terminal 77 of the "4" amplifier unit.

The circuits just described provide for the tracing of the figure 4 by the tens cathode ray tube 61T. Switch arm 49b is now standing on the 4 segment spot of the set of segments 43b. Accordingly, a circuit is completed through 44b, wire 97 in the cable 207, through the plug, through wire 97a in the clock, to the XL plate of tube 61M. The XR plate of this tube is connected via wire 98, wire 85a, wire 85, back to the 70 terminal of the "4" amplifier unit. Switch arm 49a is also standing on the 4 segment spot position of the set of segments 43a and accordingly a circuit is completed through 44a, via wire 99 in the cable, through the plug, wire 99a in the secondary clock, to the YL plate of tube 61M. The YU plate of this tube is connected to line 98 and back through the circuits previously traced to the 77 terminal of amplifier unit "4." These circuits will provide the proper potentials for tracing the figure 4 by minutes cathode ray tube 61M.

The foregoing tracing of circuits has traced the circuit connections from the amplifier units for tracing ten hours and forty-four minutes. When the master clock advances to the next minute, the minute contacts 24 close and advance the minutes stepping switch arms 49a and 49b from the 4th spot to the 5th segment spot. This operation of the stepping switches will cut off the "4" amplifier unit and "4" pattern component emitter disk from circuit and will establish a circuit to the "5" amplifier unit and "5" pattern component emitter disk. Accordingly, 5 will then be displayed by the units of minutes too. The operation need not be traced for further time indications as it is similar to that previously explained.

It will be appreciated that the operation of the secondaries is wholly noiseless and that with this particular system synchronizing devices are not necessary since the various secondary clocks always receive at any given instant the voltage potentials proper to trace the time as directed by the master clock.

It will be noted that each cathode ray tube is provided with the usual biasing battery 101, one end of which is connected to the cathode 28, the other end being connected to the common line leading to YU and XR plates. An adjustable tip 102 also applies suitable potential to the number 1 anode designated 30. This is a customary cathode ray tube circuit.

Suppression of return trace

The electron beam of the electric cathode ray tube in tracing a number will proceed from one point to the next point and then to the terminating point and then quickly return to the starting point. With such quick return occasionally a faint trace may be seen on the screen on the tube as the beam jumps from the last point to the first point of a number. Referring to Fig. 9, for example, in tracing the number 7, the beam goes from points 1 to 13, then downwardly to point 31 and then quickly jumps back as shown in the dotted line to point 1. Also in tracing the numbers 10, 11 and 12, the beam in jumping from the 1 to the 0 in 10, and the 1 to the 1 in 11, or the 1 to the 2 in 12, would show a faint trace. The return trace, so to speak, occurs at a relatively high frequency and this high frequency characteristics is used to wholly suppress the cathode ray beam on passing from the terminating point of one figure to the beginning point of that figure or of another figure.

Referring to the disk shown in Fig. 8, the Y track at the point 1, which also corresponds to the point 31, has a sudden increase in width. Such sudden increase of width of track will increase the current flow through tube 64 (Fig. 14a), thereby increasing the potential across the resistor 68.

Referring to Fig. 14c there is shown a resistor 103 in series with two condensers 104 and 105. This assembly of resistors and condensers is disposed intermediate circuit 99a and circuit 98 on the 61M tube for example. When the track of a pattern component emitter abruptly changes in width, there is a rapid change of potential applied to the two condensers 104 and 105. By properly proportioning the condensers the resistor 103 will receive current only upon such rapid change of potential. With such current flow across resistor 103, the upper end of the resistor will increase in potential with respect to the lower end of the resistor, thereby decreasing the normal bias on a supplemental tube 106. Such normal bias is supplied by a suitable battery 107. Increased current flow in the plate circuit of tube 106 will accordingly increase the potential drop across a resistor 108 and thus apply an increase negative bias to the grid 29 of the cathode ray tube. This increased negative bias applied to the control grid will momentarily suppress the cathode ray tracing beam and will continue the suppression until point 1 has been again reached. Grid 29 receives its normal bias through a normal biasing battery 109 disposed in the circuit relation shown.

The system has been explained incorporating the program unit. By the use of the program unit, the current supply for the various heating filaments and lamps and for the driving motor may be turned off during non-working hours to conserve current and length of life of the various lamps and tubes. However, such program control may be dispensed with if desired. With a clock system of the type described wherein the secondary clocks are of the cathode ray type, it is possible to connect a clock to a line at any point in the system, and this secondary clock without any manual setting whatsoever will immediately display the time indication of the master clock. No setting of a particular clock has to be made and no special synchronizing controls are necessary.

What is claimed is:

1. The invention according to claim 5 wherein a plurality of cathode ray tubes are provided for displaying a plurality of time indicating digits.

2. The invention according to claim 5 wherein a plurality of cathode ray tubes are provided for displaying a plurality of indication digits, one of said tubes displaying a multi-digit time indication, and wherein the pattern control means of the source means includes supplemental pattern control source means providing electrical coordinate components for the required multi-digit character display.

3. A clock system with a master clock and one or more secondary clocks, with channels between the master and the secondary clock or clocks, including in combination, generating means including continuously movable pattern control source means for all of the different digits for generating the different trace controlling coordinate components required for controlling the tracing of the outline of each of all of the different digits which may be displayed by the secondary clock or clocks, each secondary clock including cathode ray tube means having character tracing and displaying means associated therewith and responsive to said generated electrical trace controlling coordinate components, switching mechanism controlled by the master clock for selectively rendering the pattern control source means related to the time position of the master clock effective through said channels to control tracing of the related digit or digits by a cathode ray secondary clock or clocks whereby the secondary clock or clocks may display time related to master clock time.

4. A clock system with a master clock and one or more secondary clocks with lines leading from the master clock to the secondary clock or clocks and including in combination, generating means including pattern component source means for the different digits for generating electrical trace controlling coordinate components for controlling the tracings of outline of each of the digit or digits to be displayed by the secondary clock or clocks, each secondary clock comprising cathode ray tube means having associated therewith character displaying and tracing means responsive to said generated trace controlling coordinate electrical components, different sets of switching mechanisms controlled by the master clock for connecting the generating means related to the time position of the master clock to the said lines whereby a secondary clock may display a time related to the master clock time, and means at a secondary clock for selectively connecting said clock to different sets of lines which carry electrical trace controlling coordinate components pertaining to different times from said different sets of switching mechanisms at the master clock, one set of said switching mechanisms being in phase with the time indication of the master clock and the other switching means being displaced in phase with respect to the time indication of the master clock.

5. In a clock system comprising a master clock and one or more secondary clocks, the combination wherein the secondary clocks include cathode ray tubes for displaying time indications, generating means at the master clock, including pattern control source means, one for each different digit or character to be displayed by the secondary clock or clocks, for generating the different electrical trace controlling coordinate components required for tracing the outline of each of the different characters which are required for representing time indications at the secondary clocks, with means under control of the master clock to control the display and change of display of time indications by the cathode ray tubes of the secondary clock or clocks, said last named means including means for selectively causing the electrical trace controlling components corresponding to the master clock time as generated by the generating means under control of the related pattern control source means to control the cathode ray tube or tubes of the secondary clock or clocks to trace the outline of the related digit or digits and display the master clock time.

6. In a clock system with a master clock and one or more secondary clocks with electrical channels between the master clock and the secondary clock or clocks, the combination of generating means including source means for coordinate pattern components for each one of different digits to be displayed by the secondary clock, means for photo-electrically sensing the source means for the coordinate pattern components, mechanism for continuously moving the source means and sensing means relatively to each other to cause the generating means to generate recurrently the electrical coordinate components corresponding to the different coordinate pattern components for the digits which may be displayed, circuits controlled by the generating means for transmitting through said channels the electrical coordinate components of the digits to be displayed, said secondary clock comprising a cathode ray tube with digit tracing and display means associated therewith and responsive to the electrical coordinate components transmitted through said channels, and switching means selectively controlled by the master clock according to master clock time for selecting the electrical coordinate components for effectively controlling the digit tracing and display means associated with a cathode ray secondary clock to trace and display the corresponding digit related to the master clock time.

7. The invention according to claim 6 wherein the source means for the coordinate pattern components comprises a plurality of separate continuously rotatable source means, each having the coordinate pattern components for one of the different digits or characters to be displayed and wherein the switching means under control of the master clock selectively establishes circuits to the generating means which generate electrical coordinate components derived from the source means related to and corresponding to master clock time.

8. A clock system including a master clock and one or more secondary clocks with lines leading from the master to the secondary clocks and including in combination, at each secondary clock, cathode ray tube means adapted to be influenced by applied coordinate electrical components for displaying time indications, generating means at the master clock for generating the set of varying electrical coordinate components required for controlling the tracing of the outlines of a set of all the different time indications which may be displayed at different times by the secondary clock or clocks, said generating means including continuously movable control means and switching mechanism controlled by the master clock in accordance with master clock time for selecting from the set of generated components those components corresponding to time indications related to master clock time for effectively influencing the cathode ray tube means of the secondary clock or clocks so that the latter display time indications relate to master clock time.

9. In a clock system comprising a master clock and one or more secondary clocks, the combination wherein the secondary clocks include cathode ray tube means adapted to receive electrical coordinate components for controlling the tracing and visible display of time indications, generating means associated with the master clock for generating the set of varying electrical coordinate components required for controlling the tracing of the outlines of a set of characters which comprises all of the different time indications which possibly may be displayed at different times by the secondary clock or clocks, with means under the control of the master clock to control the display and change of display of time indications by the cathode ray tube means of the secondary clock or clocks, said last named means including switching means to select, in accordance with master clock time, which electrical coordinate components of the complete set of generated components are to be effective to cause visible display of the indications by the cathode ray tube means and to reject unwanted components of the generated set.

JAMES W. BRYCE.

CERTIFICATE OF CORRECTION.

Patent No. 2,271,539.  February 3, 1942.

JAMES W. BRYCE.

It is hereby certified that error appears in the printed specification of the above numbered patent requiring correction as follows: Page 7, second column, line 22, claim 3, after "different" insert --electrical--; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.